(12) United States Patent
Yoshida et al.

(10) Patent No.: US 10,063,118 B2
(45) Date of Patent: Aug. 28, 2018

(54) STATOR FOR ROTARY ELECTRIC MACHINE

(71) Applicant: Mitsubishi Electric Corporation, Tokyo (JP)

(72) Inventors: Shinichiro Yoshida, Tokyo (JP); Michiya Yasui, Tokyo (JP); Toshiyuki Sugai, Tokyo (JP); Shuichi Tamura, Tokyo (JP); Yuki Yamamoto, Tokyo (JP); Masaya Inoue, Tokyo (JP); Akihiro Yamamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 14/782,959

(22) PCT Filed: Apr. 8, 2013

(86) PCT No.: PCT/JP2013/060630
§ 371 (c)(1),
(2) Date: Oct. 7, 2015

(87) PCT Pub. No.: WO2014/167628
PCT Pub. Date: Oct. 16, 2014

(65) Prior Publication Data
US 2016/0043604 A1 Feb. 11, 2016

(51) Int. Cl.
*H02K 3/28* (2006.01)
*H02K 3/18* (2006.01)
(Continued)

(52) U.S. Cl.
CPC ............. *H02K 3/28* (2013.01); *H02K 3/18* (2013.01); *H02K 3/325* (2013.01); *H02K 3/48* (2013.01);
(Continued)

(58) Field of Classification Search
CPC ............ H02K 3/18; H02K 3/325; H02K 3/48; H02K 3/522; H02K 15/12; H02K 5/08;
(Continued)

(56) References Cited

U.S. PATENT DOCUMENTS 3,862,492 A * 1/1975 Crabb ................. H02K 3/325
29/596
7,649,295 B2 * 1/2010 Fukui ................. H02K 3/522
310/215

(Continued)

FOREIGN PATENT DOCUMENTS

JP 2006-067778 A 3/2006
JP 2008-109732 A 5/2008
(Continued)

OTHER PUBLICATIONS

Communication dated Nov. 24, 2016, from the European Patent Office in counterpart European Application No. 13881700.2.
(Continued)

*Primary Examiner* — Forrest M Phillips
(74) *Attorney, Agent, or Firm* — Sughrue Mion, PLLC; Richard C. Turner (57) ABSTRACT

The rotary electric machine includes concentrated winding coil that is configured by winding a conductor wire around a tooth for multiple laps so as to pass through a concave space that is formed by trunk portions and first and second flange portions of first and second insulators, a crossover points of the conductor wire being formed on a coil end of the concentrated winding coil that is positioned above the first insulator, slot-housed portions of the concentrated winding coil that are positioned on two circumferential sides of the tooth being configured such that the conductor wire is arranged in a staggered stacking pattern in multiple rows and
(Continued)

in multiple layers, and a varnish being applied to the coil end that is positioned above the first insulator.

8 Claims, 7 Drawing Sheets

(51) Int. Cl.
   *H02K 3/52* (2006.01)
   *H02K 15/12* (2006.01)
   *H02K 3/48* (2006.01)
   *H02K 3/32* (2006.01)
   *H02K 5/08* (2006.01)
   *H02K 5/22* (2006.01)
(52) U.S. Cl.
   CPC ............ *H02K 3/522* (2013.01); *H02K 15/12* (2013.01); *H02K 5/08* (2013.01); *H02K 5/225* (2013.01); *H02K 2203/12* (2013.01)
(58) Field of Classification Search
   CPC .... H02K 5/225; H02K 2203/12; H02K 3/487; H02K 3/345; H02K 3/34
   USPC .......................................... 310/71, 214, 215
   See application file for complete search history.

(56)     References Cited

U.S. PATENT DOCUMENTS

| | | | | |
|---|---|---|---|---|
| 8,610,328 | B2* | 12/2013 | Yoshida | H02K 3/522 |
| | | | | 310/194 |
| 9,467,018 | B2* | 10/2016 | Kitta | H02K 3/522 |
| 9,748,812 | B2* | 8/2017 | Kim | H02K 3/34 |
| 9,793,774 | B2* | 10/2017 | Yokota | H02K 3/12 |
| 2006/0022549 | A1 | 2/2006 | Otsuji | |
| 2006/0068617 | A1 | 3/2006 | Migita et al. | |
| 2007/0279178 | A1 | 12/2007 | Zimmer et al. | |
| 2010/0187918 | A1 | 7/2010 | Takahashi et al. | |
| 2010/0201213 | A1 | 8/2010 | Kataoka et al. | |
| 2012/0286619 | A1* | 11/2012 | Tsuiki | H02K 3/522 |
| | | | | 310/215 |
| 2013/0043743 | A1* | 2/2013 | Kim | H02K 3/34 |
| | | | | 310/43 |
| 2013/0270959 | A1* | 10/2013 | Kreidler | H02K 1/148 |
| | | | | 310/215 |
| 2014/0175937 | A1* | 6/2014 | Coldwate | H02K 3/34 |
| | | | | 310/215 |
| 2015/0008769 | A1* | 1/2015 | Uchitani | H02K 3/522 |
| | | | | 310/43 |
| 2015/0035406 | A1* | 2/2015 | Huang | H02K 3/345 |
| | | | | 310/215 |

FOREIGN PATENT DOCUMENTS

| | | |
|---|---|---|
| JP | 2008-206322 A | 9/2008 |
| JP | 2009-038863 A | 2/2009 |
| JP | 2009-072055 A | 4/2009 |
| JP | 2009-278851 A | 11/2009 |
| JP | 2010-213392 A | 9/2010 |
| JP | 2012-239347 A | 12/2012 |
| JP | 2012-249398 A | 12/2012 |
| JP | 2013-051749 A | 3/2013 |

OTHER PUBLICATIONS

International Search Report of PCT/JP2013/060630 dated Jul. 9, 2013.

* cited by examiner

STATOR FOR ROTARY ELECTRIC MACHINE

CROSS REFERENCE TO RELATED APPLICATIONS

This is a National Stage of International Application No. PCT/JP2013/060630 filed Apr. 8, 2013, the contents of which are incorporated herein by reference in its entirety.

TECHNICAL FIELD

The present invention relates to a stator for a rotary electric machine such as an electric motor, or a generator, for example, and particularly relates to a winding construction that increases varnish impregnating ability into a coil end of a stator winding, and that can increase space factor of a conductor wire inside slots.

BACKGROUND ART

In stators for rotary electric machines such as electric motors or generators, a varnish has been impregnated into a stator winding and cured in order to fix a stator winding that is mounted to a stator core, in order to ensure insulation between the stator core and the stator winding, and also in order to increase heat radiating characteristics of the stator winding.

Conventional methods for impregnating varnish into stator windings include impregnating a varnish into coil ends of a stator winding by dripping varnish from above onto the coil ends while rotating a stator core around a central axis such that the central axis is horizontal, and impregnating the varnish inside slots from the coil ends using capillary action (see Patent Literature 1, for example).

Other conventional methods for impregnating varnish into stator windings include impregnating a varnish into coil ends by dripping varnish from above onto coil ends of a stator winding such that a central axis is vertical, and impregnating the varnish inside slots from the coil ends using capillary action (see Patent Literature 2, for example).

In recent years, compactness and high output have been required in rotary electric machines such as electric motors or generators. With regard to downsizing rotary electric machines of this kind, stator windings that have concentrated windings in which conductor wires are wound onto individual stator core teeth have been used with a view to downsizing coil ends that do not generate effective magnetic flux. Stator windings of this kind are generally constituted by concentrated winding coils that are produced by disposing insulators on two axial ends of teeth of core segments that have a single tooth, and winding conductor wires so as to do laps around the teeth using the insulators as bobbins. In concentrated winding coils that are produced in this manner, because the coil ends are hidden by the insulators when viewed from a radial direction, the coil ends have been impregnated with varnish using the varnish impregnating method that is described in Patent Literature 2.

CITATION LIST

Patent Literature

Patent Literature 1: Japanese Patent Laid-Open No. 2012-269398 (Gazette)
Patent Literature 2: Japanese Patent Laid-Open No. 2008-109732 (Gazette)

SUMMARY OF THE INVENTION

Problem to be Solved by the Invention

Because the concentrated winding coils can be wound onto the teeth of the core segments so as to be placed in close proximity to each other, space factor of the conductor wires can be increased. However, increasing the space factor means that the conductor wires are wound at a high density, resulting in a construction into which it is difficult to impregnate varnish. Consequently, in the varnish impregnating method that is described in Patent Literature 2, one problem has been that the varnish is not impregnated sufficiently into the coil ends, nor inside the slots.

Thus, methods in which coil ends are immersed in a varnish tank in a vacuum-drawn state, and the vacuum state is subsequently released to impregnate the varnish into the coil ends, and into the slots, are also conceivable. However, in such methods, some problems have been that the equipment is bulky, increasing manufacturing costs, and that excess varnish also adheres to the stator core and hardens, giving rise to a need for an operation to remove it.

The present invention aims to solve the above problems and an object of the present invention is to provide a stator for a rotary electric machine that can increase space factor of a conductor wire inside slots by crossing the conductor wire between layers at axial end portions of a tooth to enable arrangement of a staggered stacking pattern of the conductor wires on two circumferential sides of the tooth, and that can also increase pickup of varnish into a coil end without using a special varnish impregnating method by forming a crossover point of the conductor wire at the coil end.

Means for Solving the Problem

In order to achieve the above object, according to one aspect of the present invention, there is provided a stator for a rotary electric machine including: a plurality of core segments that each have a circular arc-shaped back yoke portion and a tooth, the plurality of core segments being arranged into an annular shape by butting together circumferential side surfaces of the back yoke portions; a cylindrical frame into an inner circumferential side of which the plurality of core segments that are arranged into the annular shape are inserted and held; first and second insulators that each have a trunk portion and first and second flange portions that are linked to two longitudinal ends of the trunk portion, the first and second insulators being disposed such that bottom surfaces of the trunk portions are placed alongside two axial end surfaces of the tooth such that longitudinal directions of the trunk portions are aligned with a radial direction of the tooth and the first flange portions are oriented radially inward; a concentrated winding coil that is configured by winding a conductor wire around the tooth for multiple laps so as to pass through a concave space that is formed by the trunk portions and the first and second flange portions of the first and second insulators; and insulating papers that are disposed between two circumferential side surfaces of the tooth and the concentrated winding coil. A crossover point of the conductor wire is formed on a coil end of the concentrated winding coil that is positioned above the first insulator, slot-housed portions of the concentrated winding coil that are positioned on two circumferential sides of the tooth are configured such that the conductor wire is arranged in a staggered stacking pattern in multiple rows and in multiple layers, and a varnish is applied to the coil end that is positioned above the first insulator.

Effects of the Invention

According to the present invention, because the slot-housed portions of the concentrated winding coils are configured such that the conductor wire is arranged in a staggered stacking pattern in multiple rows and in multiple layers, the conductor wire in the slot-housed portions is wound at a high density, increasing space factor, and enabling increased output to be achieved. Because crossover points of the conductor wire are formed in the coil ends of the concentrated winding coils to which the varnish is applied, gaps are formed in the conductor wire, facilitating penetration of the varnish. Thus, varnish pickup into the coil ends can be increased easily without using special varnish applying methods, and varnish pickup into the slot-housed portions can also be increased.

DESCRIPTION OF EMBODIMENTS

A preferred embodiment of the stator for a rotary electric machine according to the present invention will now be explained using the drawings.

Figure 1:
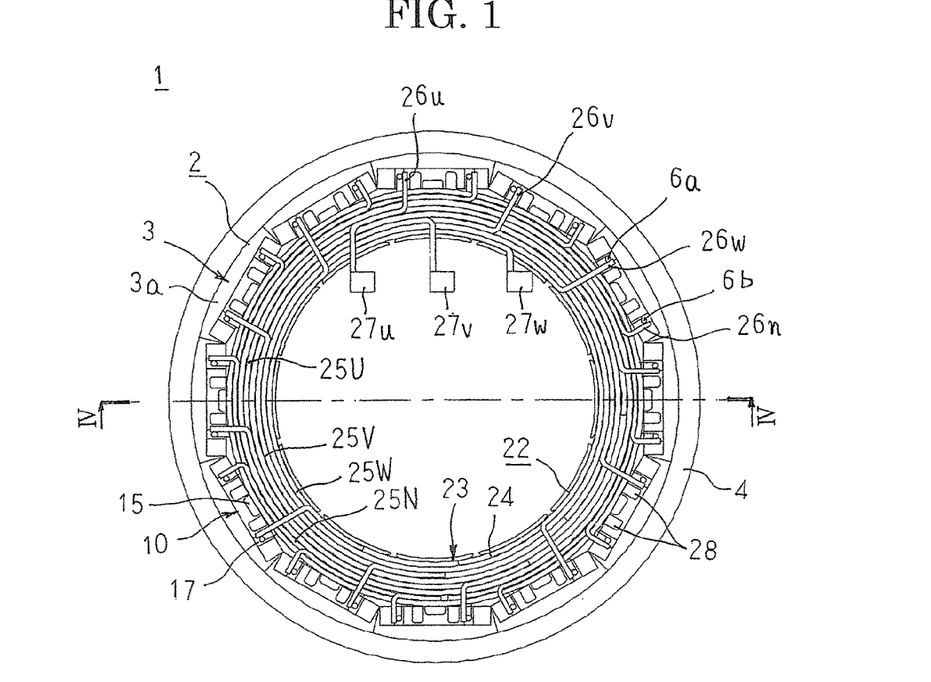
FIG. 1 is an end elevation of a stator for a rotary electric machine according to a preferred embodiment of the present invention when viewed from near a first axial end.
Figure 2:
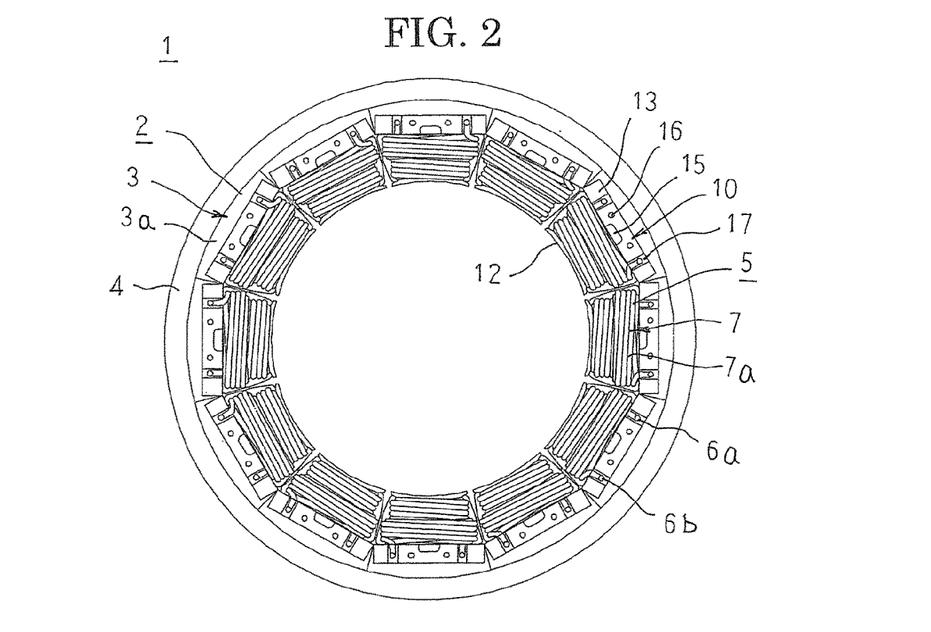
FIG. 2 is an end elevation of the stator for a rotary electric machine according to the preferred embodiment of the present invention that shows a state in which a connecting board is omitted viewed from near the first axial end.
Figure 3:
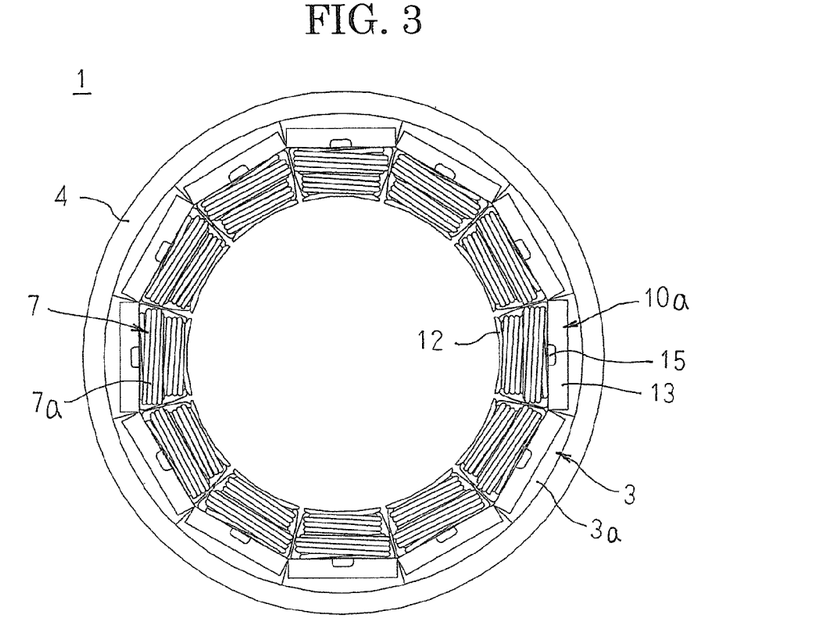
FIG. 3 is an end elevation of the stator for a rotary electric machine according to the preferred embodiment of the present invention that shows a state in which a connecting board is omitted viewed from near a second axial end.
Figure 4:
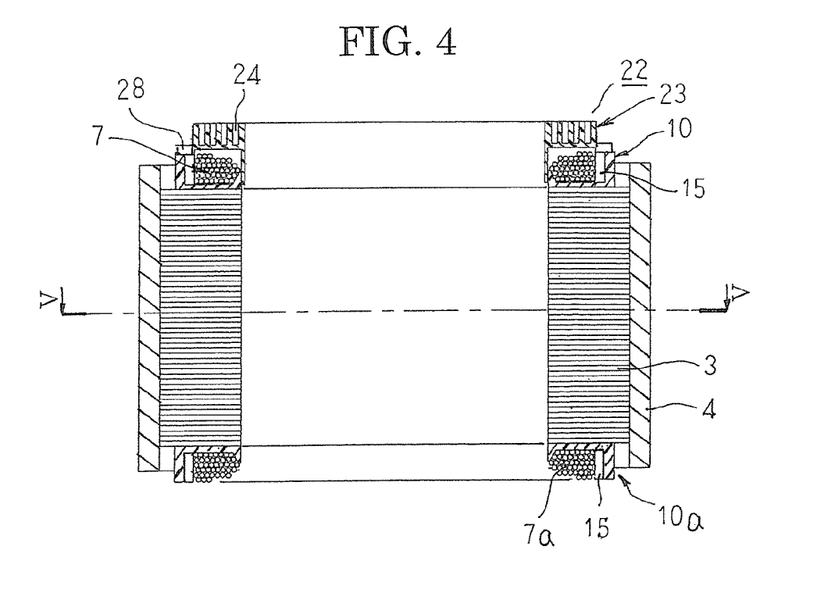
FIG. 4 is a cross section that is taken along Line IV-IV in FIG. 1 so as to be viewed in the direction of the arrows.
Figure 5:
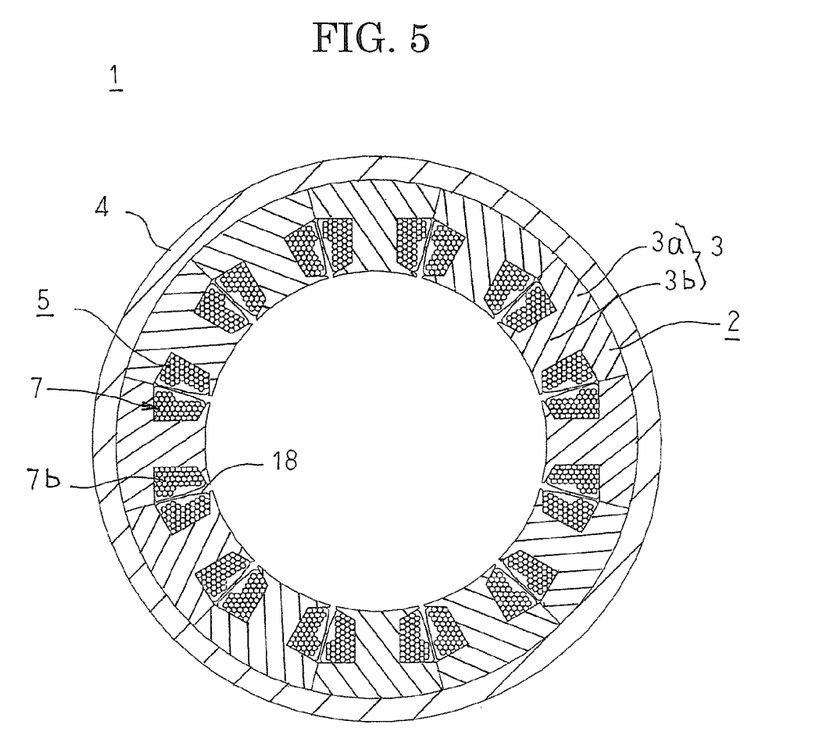
FIG. 5 is a cross section that is taken along Line V-V in FIG. 4 so as to be viewed in the direction of the arrows.
Figure 6:
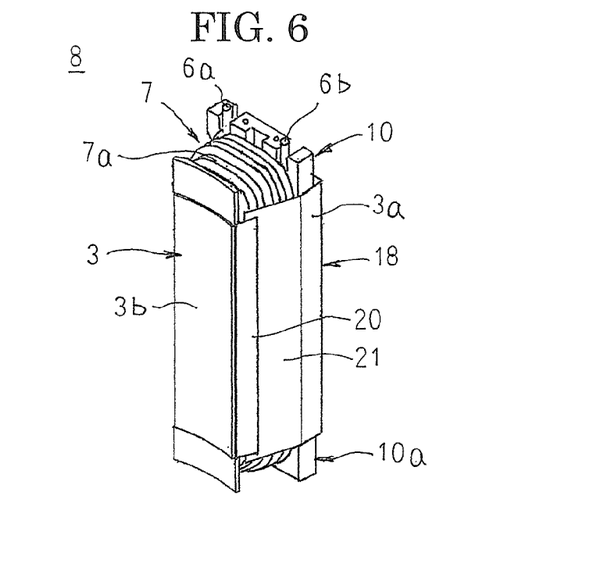
FIG. 6 is an oblique projection that shows a coil assembly that forms part of the stator for a rotary electric machine according to the preferred embodiment of the present invention.
Figure 7:
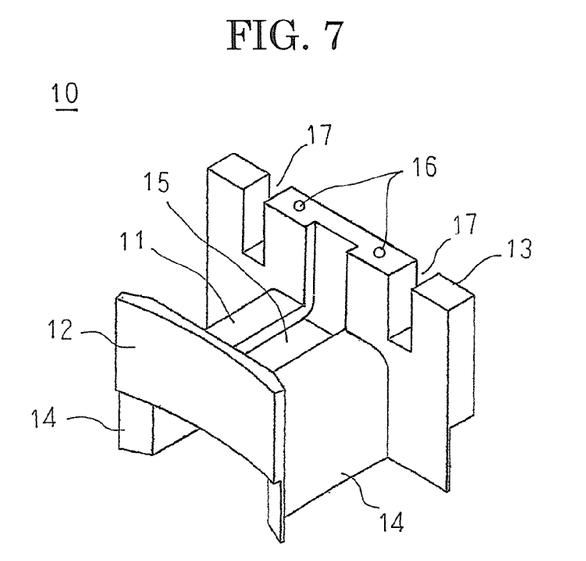
FIG. 7 is an oblique projection that shows a first insulator that is used in the stator for a rotary electric machine according to the preferred embodiment of the present invention.
Figure 8:
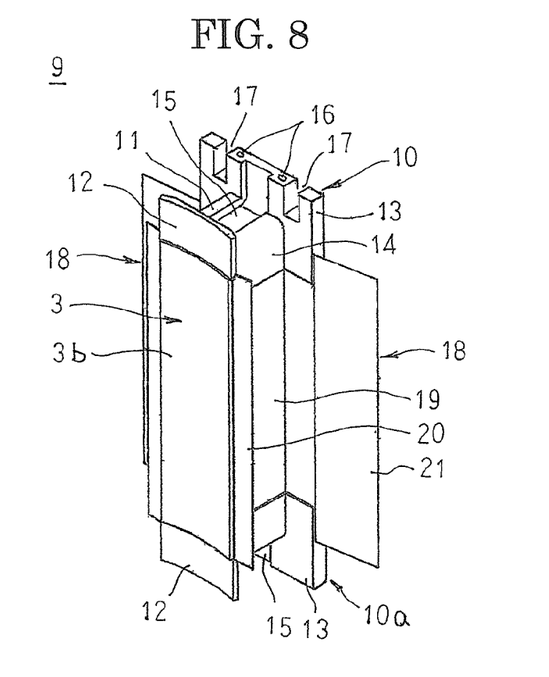
FIG. 8 is an oblique projection that shows a state of the coil assembly that forms part of the stator for a rotary electric machine according to the preferred embodiment of the present invention before a concentrated winding coil is mounted.
Figure 9:
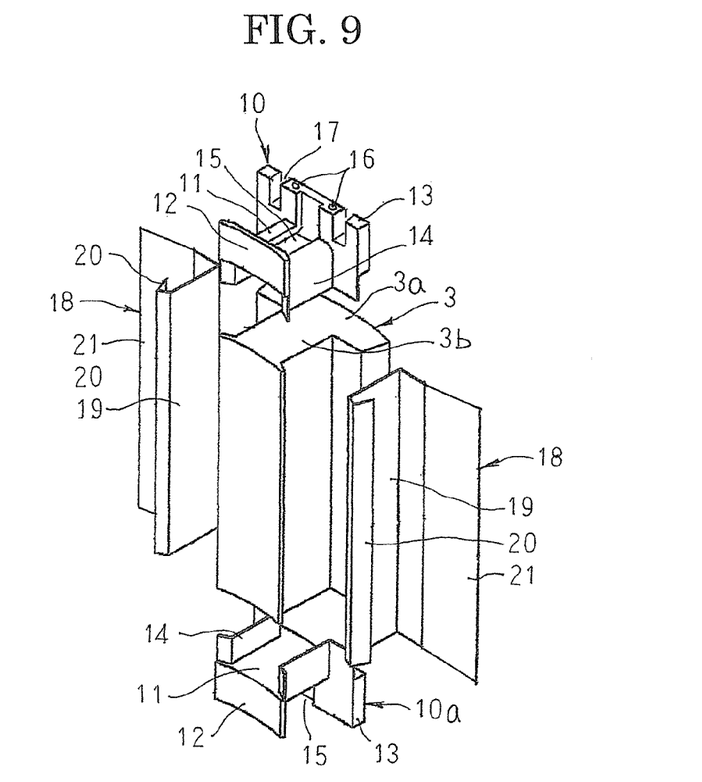
FIG. 9 is an exploded oblique projection that shows the coil assembly that forms part of the stator for a rotary electric machine according to the preferred embodiment of the present invention.

FIG. 1 is an end elevation of a stator for a rotary electric machine according to a preferred embodiment of the present invention when viewed from near a first axial end, FIG. 2 is an end elevation of the stator for a rotary electric machine according to the preferred embodiment of the present invention that shows a state in which a connecting board is omitted viewed from near the first axial end, FIG. 3 is an end elevation of the stator for a rotary electric machine according to the preferred embodiment of the present invention that shows a state in which a connecting board is omitted viewed from near a second axial end, FIG. 4 is a cross section that is taken along Line IV-IV in FIG. 1 so as to be viewed in the direction of the arrows, FIG. 5 is a cross section that is taken along Line V-V in FIG. 4 so as to be viewed in the direction of the arrows, FIG. 6 is an oblique projection that shows a coil assembly that forms part of the stator for a rotary electric machine according to the preferred embodiment of the present invention, FIG. 7 is an oblique projection that shows a first insulator that is used in the stator for a rotary electric machine according to the preferred embodiment of the present invention, FIG. 8 is an oblique projection that shows a state of the coil assembly that forms part of the stator for a rotary electric machine according to the preferred embodiment of the present invention before a concentrated winding coil is mounted, and FIG. 9 is an exploded oblique projection that shows the coil assembly that forms part of the stator for a rotary electric machine according to the preferred embodiment of the present invention. Moreover, for simplicity, concentrated winding coils are omitted from FIG. 9.

In FIGS. 1 through 5, the stator 1 includes: an annular stator core 2; a stator winding 5 that includes twelve concentrated winding coils 7; and a connecting board 22 that is disposed at a first axial end of the stator core 2, and that connects the concentrated winding coils 7, the stator 1 being used in a rotary electric machine such as an electric motor or a generator.

The stator core 2 includes twelve core segments 3. The core segments 3 are formed so as to have shapes that are obtained by dividing the stator core 12 into twelve equal sections circumferentially. The core segments 3 are produced by laminating and integrating a large number of electromagnetic steel plates that have been punched into identical shapes, for example, and have: a circular arc-shaped back yoke portion 3a; and a tooth 3b that is disposed so as to extend radially inward from a circumferential center of an inner circumferential surface of the back yoke portion 3a.

First insulators 10 are resin-molded bodies in which a nylon or polyphenylene sulfide (PPS) resin is used, for example. As shown in FIG. 7, the insulators 10 have: a trunk portion 11 in which a cross section that is perpendicular to a longitudinal direction is an approximately rectangular shape in which rounding is applied to two corner portions on an upper portion side, and that is disposed such that the longitudinal direction is oriented in a radial direction of a tooth 3b and such that a bottom surface is parallel to a first axial end surface of the tooth 3b; an angular C-shaped first flange portion 12 that is linked to a first longitudinal end of the trunk portion 11, and that is disposed so as to cover the first end surface of the tooth 3b near a tip end; and a thick tabular second flange portion 13 that is disposed on a second longitudinal end of the trunk portion 11 so as to face the first flange portion 12, and that is disposed so as to cover an inner circumferential side of a first end surface of the back yoke portion 3a. In addition, thin skirt portions 14 are formed so as to extend outward from inner-circumferential lower edge portions of two end portions in a width direction of the trunk portion 11, and from two wing portions of the second flange portion 13 on an opposite side from an upper surface of the trunk portion 11, and are disposed so as to cover a vicinity of first end surfaces of the side surfaces of the teeth 3b and a vicinity of a first end surface of the inner circumferential surface of the back yoke portion 3a.

A varnish groove 15 is formed on a surface (an inner circumferential surface) of the second flange portion 13 that faces the first flange portion 12, centrally in the width direction on an upper surface of the trunk portion 11 so as to extend from an upper portion of the second flange portion 13 to the first flange portion 12. A pair of insulator fixing apertures 16 are formed on an upper surface of the second flange portion 13 so as to be positioned on opposite sides of the varnish groove 15. In addition, a pair of conductor wire outlet grooves 17 are formed on the two wing portions of the second flange portion 13 so as to have openings on the upper surface of the second flange portion 13 and pass through in a radial direction.

Second insulators 10a are resin-molded bodies in which a nylon or polyphenylene sulfide (PPS) resin is used, for example, and are configured in a similar or identical manner to that of the first insulators 10 except that the insulator fixing apertures 16 and the conductor wire outlet grooves 17 are omitted.

Insulating papers 18 are formed by press-molding a sheet that is produced by sandwiching a polyphenylene sulfide (PPS) film between aramid papers, for example. As shown in FIGS. 8 and 9, the insulating papers 18 have: protective portions 19 that are placed on wall surfaces of the back yoke portion 3a and the tooth 3b of the core segment 3 that form the slots; and first and second cover portions 20 and 21 that are folded over to cover the concentrated winding coil 7.

Thus, the insulating papers 18 are disposed such that the protective portions 19 are placed on the wall surfaces of the back yoke portion 3a and the tooth 3b that form the slots from two circumferential sides of the core segment 3, and the first and second insulators 10a and 10b are disposed such that the longitudinal directions of the trunk portions 11 are oriented in a radial direction of the tooth 3b so as to place the bottom surfaces of the trunk portions 11 alongside the end surfaces of the core segment 3 from two axial ends of the core segment 3.

Here, the first and second insulators 10a and 10b are disposed such that the skirt portions 14 extend so as to face the wall surfaces of the back yoke portion 3a and the tooth 3b that form the slots so as to leave a slight gap, and cover entire axial end surfaces of the tooth 3b and inner circumferential sides of the axial end surfaces of the back yoke portion 3a. Two ends of the protective portions 19 of the insulating papers 18 are inserted between the skirt portions 14 and the wall surfaces of the back yoke portion 3a and the tooth 3b that form the slots to ensure an insulation creepage distance between the core segments 3.

A conductor wire 6 that has a circular cross section, such as a copper wire or an aluminum wire that is coated with an insulating enamel resin, for example, is led in between the first flange portion 12 and the second flange portion 13 of the first insulators 10 through one of the conductor wire outlet grooves 17, is wound for multiple laps around the tooth 3b of the core segment 3 so as to pass through a concave space that is formed by the trunk portions 11 and the first and second flange portions 12 and 13 of the first and second insulators 10a and 10b, and is then led out through the other conductor wire outlet groove 17. A coil assembly 8 onto which the concentrated winding coil 7 is wound is produced thereby. The first and second cover portions 20 and 21 of the insulating papers 18 are folded over such that this coil assembly 8 assumes the state that is shown in FIG. 6.

Coil assemblies 8 that are configured in this manner are arranged in an annular shape circumferentially by butting together circumferential side surfaces of the back yoke portions 3a of the core segments 3, and are press-fitted into and fixed to an annular frame 4, or are inserted inside and fixed to the frame 4 by shrinkage fitting, to produce the stator 1.

In a stator 1 that is produced in this manner, the core segments 3 are arranged into an annular shape such that the circumferential side surfaces of the back yoke portions 3a are butted against each other to constitute the stator core 2. The back yoke portions 3a link circumferentially to configure a back yoke of the stator core 2, and spaces that are formed by the back yoke and adjacent teeth 3b constitute slots. The stator winding 5 is formed by the twelve concentrated winding coils 7 that are wound onto the teeth 3b of the core segments 3. Portions of the concentrated winding coils 7 that protrude axially outward from the stator core 2 constitute coil ends 7a, and portions of the concentrated winding coils 7 that are disposed inside the slots constitute slot-housed portions 7b. The protective portions 19 of the insulating papers 18 are positioned between the concentrated winding coils 7 and the stator core 2 to ensure insulation between the two. The first and second cover portions 20 and 21 of the insulating papers 18 are folded over and are positioned between the adjacent concentrated winding coils 7, to ensure interphase insulation.

The connecting board 22 is produced into a ring shape using a PPS resin, for example, and includes: a holder 23 on a first axial surface of which four annular slits 24 are formed concentrically; and four busbars 25U, 25V, 25W, and 25N that are mounted in the respective slits 24. The busbars 25U, 25V, 25W, and 25N are each produced by punching a copper plate material using a press, for example. Connecting terminals 26u, 26v, 26w, and 26n are formed so as to extend radially outward from each of the busbars 25U, 25V, 25W, and 25N, and power supplying terminals 27u, 27v, and 27w are formed so as to extend radially inward from each of the busbars 25U, 25V, and 25W.

Twelve pairs of foot portions 28 are respectively formed so as to protrude radially outward from the holder 23 at a uniform pitch in a circumferential direction. Pins (not shown) that are fitted into the insulator fixing apertures 16 when the holder 23 is disposed at the first axial end of the stator core 2 are formed on lower surfaces of the foot portions 28. In addition, a cylindrical peripheral wall 29 is formed so as to project axially outward from an inner circumferential edge of the holder 23 so as to contact inner circumferential surfaces of the first flange portions 12 of the first insulators 10 and cover the first insulators 10 when the holder 23 is disposed at the first axial end of the stator core 2. Moreover, the busbars 25U, 25V, 25W, and 25N may be mounted into the slits 24 and then be fixed to the holder 23 by resin potting, or the busbars 25U, 25V, 25W, and 25N may be formed integrally into the holder 23 by insert-molding.

Figure 10:
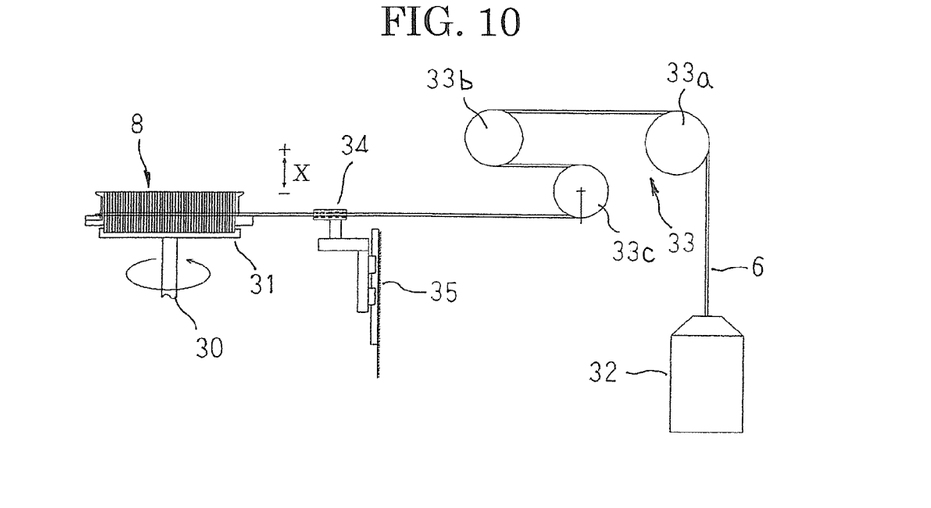
FIG. 10 is a schematic configuration diagram that shows a concentrated winding coil winding apparatus that is used in the stator for a rotary electric machine according to the preferred embodiment of the present invention.

Next, a method for assembling the coil assembly 8 will be explained with reference to FIGS. 8 through 11G. FIG. 10 is a schematic configuration diagram that shows a concentrated winding coil winding apparatus that is used in the stator for a rotary electric machine according to the preferred embodiment of the present invention, and FIGS. 11A through 11G show diagrams that show an arranged state of conductor wire in a concentrated winding coil winding method that is used in the stator for a rotary electric machine according to the preferred embodiment of the present invention. Moreover, each of FIGS. 11A through 11G shows a cross section that is perpendicular to the axial direction of the core segments 3, and for simplicity an end near the first insulators 10 will be designated a connected end, an end near the second insulator 10*a* will be designated an unconnected end, the slot to the left of the tooth 3*b* will be designated the left slot, and the slot to the right of the tooth 3*b* will be designated the right slot. The conductor wire 6 at the connected end is indicated by solid lines, and the conductor wire 6 at the unconnected end is indicated by broken lines.

First, as shown in FIG. 9, insulating papers 18 are disposed such that the protective portions 19 are placed on the wall surfaces of the back yoke portion 3*a* and the tooth 3*b* that form the slots from two circumferential sides of a core segment 3, and first and second insulators 10*a* and 10*b* are disposed such that the longitudinal directions of the trunk portions 11 are oriented in a radial direction of the tooth 3*b* so as to place the bottom surfaces of the trunk portions 11 alongside the end surfaces of the core segment 3 from two axial ends of the core segment 3.

Thus, as shown in FIG. 8, an assembly 9 in which the first and second insulators 10*a* and 10*b* and the insulating papers 18 are mounted to the core segment 3 is assembled. By this point, two ends of the protective portions 19 are inserted between the skirt portions 14 and the wall surfaces of the back yoke portion 3*a* and the tooth 3*b* that form the slots, and the insulating papers 18 are held on two circumferential sides of the core segment 3.

Next, the back yoke portion 3*a* of the core segment 3 is fixed to a clamper 31 that is mounted to a rotating main shaft 30. As shown in FIG. 10, a conductor wire 6 that is led out from a bobbin 32 is wound sequentially around pulleys 33*a*, 33*b*, and 33*c* that form part of a tensioner 33, and is then passed through a winding nozzle 34. Then, the conductor wire 6 that has been led out from the winding nozzle 34 is passed through the conductor wire outlet groove 17 near the left slot of the first insulator 10 and is fixed. Thus, tension is generated in the conductor wire 6 by the tensioner 33. The winding nozzle 34 is mounted to a guide 35 so as to be able to be reciprocated in an X direction in FIG. 10 by an actuator (not shown).

Next, the rotating main shaft 30 is rotated in the direction of the arrow in FIG. 10, and the conductor wire 6 is wound onto the assembly 9 while moving the winding nozzle 34 in the X direction at a timing that is set for each turn.

Figure 11A:
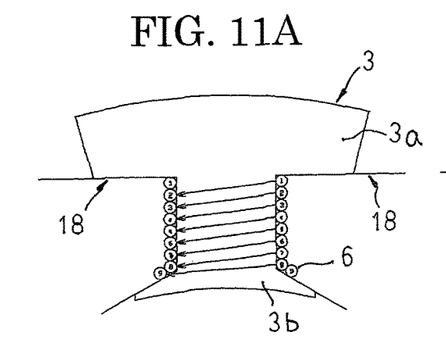
FIGS. 11A through 11G show diagrams that show an arranged state of conductor wire in a concentrated winding coil winding method that is used in the stator for a rotary electric machine according to the preferred embodiment of the present invention.

FIG. 11A shows an arranged state of conductor wire in a first layer. The conductor wire 6 that has been introduced from the connected end proceeds through the left slot to the unconnected end, proceeds toward the right slot over the upper surface of the trunk portion 11 at the unconnected end, and proceeds through the right slot to the connected end, to complete a first turn of the winding. Next, a second turn of the winding is entered after offsetting the conductor wire 6 by a single pitch (an amount proportionate to one wire diameter of the conductor wire) by moving the winding nozzle 34 in the positive (+) X direction at the connected end. The conductor wire 6 is similarly wound sequentially into the second turn, a third turn, etc., to complete the first layer of the winding when an eighth turn is wound.

At this point, in the first layer of the winding, the passes of conductor wire 6 on the trunk portion 11 at the connected end are each inclined relative to a plane that is perpendicular to the radial direction that passes through centrally in a width direction of the tooth 3*b*, and are arranged in the radial direction so as to be in contact with each other. The passes of conductor wire 6 inside the left slot, inside the right slot, and on the trunk portion 11 at the unconnected end are each parallel to the plane that is perpendicular to the radial direction that passes through centrally in the width direction of the tooth 3*b*, and are arranged in the radial direction so as to be in contact with each other.

Figure 11B:
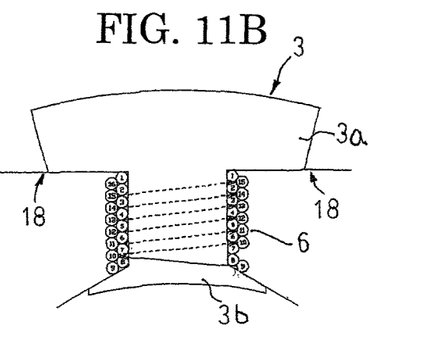

FIG. 11B shows an arranged state of conductor wire in the first layer and a second layer. At a ninth turn, which is the initial turn of the second layer, the ninth turn of the winding is entered after offsetting the conductor wire 6 by a pitch of 0.5 (half of the wire diameter) by moving the winding nozzle 34 in the positive (+) X direction at the connected end. The conductor wire 6 in the ninth turn is wound so as to be offset by a pitch of 0.5 in the positive (+) X direction from the conductor wire 6 in the eighth turn.

Next, a tenth turn of the winding is entered after offsetting the conductor wire 6 by a single pitch by moving the winding nozzle 34 in the negative (−) direction on the X axis. Then, the conductor wire 6 proceeds from the right slot toward the left slot so as to pass over the windings on the trunk portion 11 at the connected end, and proceeds through the left slot to the unconnected end so as to pass along the conductor wire 6 between the seventh turn and the eighth turn. Next, the conductor wire 6 proceeds from the left slot toward the right slot so as to pass over the windings on the trunk portion 11 at the unconnected end after offsetting the conductor wire 6 by a single pitch by moving the winding nozzle 34 in the negative (−) direction on the X axis at the unconnected end, and proceeds through the right slot to the connected end so as to pass along the conductor wire 6 between the sixth turn and the seventh turn, to complete the tenth turn of the winding.

At this point, as shown in FIG. 11B, a space that is proportionate to one diameter of the conductor wire 6 is formed in the right slot between the conductor wire 6 in the ninth turn and the tenth turn. Next, an eleventh turn of the winding is entered without moving the winding nozzle 34. Then, the conductor wire 6 proceeds from the right slot to the left slot so as to pass over the windings in the first layer on the trunk portion 11 at the connected end without moving the winding nozzle 34, and proceeds through the left slot to the unconnected end so as to pass along the conductor wire 6 between the seventh turn and the sixth turn. Then, the conductor wire 6 proceeds from the left slot to the right slot so as to pass over the windings in the first layer on the trunk portion 11 at the unconnected end after offsetting the conductor wire 6 by a single pitch by moving the winding nozzle 34 in the negative (−) direction on the X axis, and proceeds through the right slot to the connected end so as to pass along the conductor wire 6 between the fifth turn and the sixth turn, to complete the eleventh turn of the winding. Similar operations are repeated to wind a twelfth turn, a thirteenth turn, etc., through a sixteenth turn, to complete the second layer of the winding.

At this point, after the tenth turn in the second layer of the winding, the passes of conductor wire 6 inside the left slot, inside the right slot, and on the trunk portion 11 at the connected end are each parallel to the plane that is perpendicular to the radial direction that passes through centrally in the width direction of the tooth 3b, and are arranged in the radial direction so as to be in contact with each other. The passes of conductor wire 6 on the trunk portion 11 at the unconnected end are each inclined relative to a plane that is perpendicular to the radial direction that passes through centrally in a width direction of the tooth 3b, and are arranged in the radial direction so as to be in contact with each other.

Figure 11C:
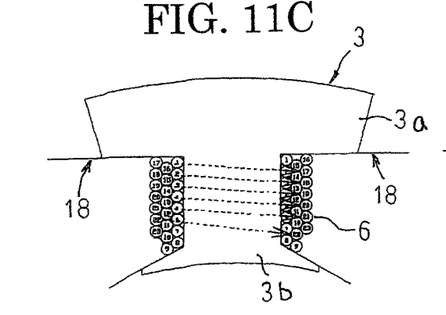
Figure 11D:
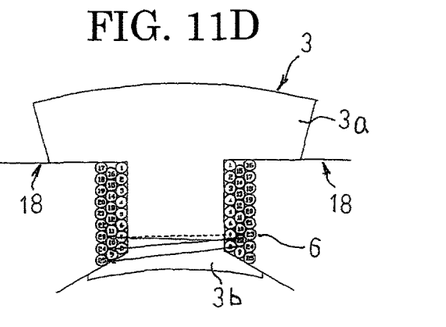

FIGS. 11C and 11D show arranged states of conductor wire in the first layer to a third layer. The conductor wire 6 in the third layer is wound from a seventeenth turn to a twenty-first turn in a similar manner to that of the second layer. Specifically, the conductor wire 6 proceeds from the right slot to the left slot so as to pass over the windings on the trunk portion 11 at the connected end without moving the winding nozzle 34, and proceeds through the left slot to the unconnected end so as to pass over the windings, and then the conductor wire 6 proceeds from the left slot to the right slot so as to pass over the windings on the trunk portion 11 at the unconnected end after offsetting the conductor wire 6 by a single pitch by moving the winding nozzle 34 in the positive (+) direction on the X axis, and proceeds through the right slot to the connected end so as to pass over the windings, to complete each turn.

Then, in a twenty-second turn of the winding, the conductor wire 6 proceeds from the left slot to the right slot so as to pass over the windings in the first layer on the trunk portion 11 at the unconnected end after offsetting the conductor wire 6 by a pitch of 1.5 by moving the winding nozzle 34 in the positive (+) direction on the X axis, and proceeds through the right slot to the connected end so as to pass between the conductor wire 6 in the ninth turn and the tenth turn in the second layer, to complete the twenty-second turn of the winding. Next, a twenty-third turn of the winding is entered after offsetting the conductor wire 6 by a pitch of 0.5 by moving the winding nozzle 34 in the negative (−) direction on the X axis at the connected end. The conductor wire 6 proceeds from the right slot to the left slot so as to pass over the windings on the trunk portion 11 at the connected end, and proceeds through the left slot to the unconnected end so as to pass between the conductor wire 6 in the tenth turn and the eleventh turn, and then the conductor wire 6 proceeds from the left slot to the right slot so as to pass over the windings on the trunk portion 11 at the unconnected end without moving the winding nozzle 34, and proceeds through the right slot to the connected end so as to pass between the conductor wire 6 in the tenth turn and the twenty-second turn, to complete the twenty-third turn.

As shown in FIG. 11D, in a twenty-fourth turn and a twenty-fifth turn, the conductor wire 6 passes over the windings on the trunk portion 11 at the connected end after being offset by a single pitch by moving the winding nozzle 34 in the positive (+) direction on the X axis, and the conductor wire 6 passes over the windings on the trunk portion 11 at the unconnected end without moving the winding nozzle 34. Winding of the third layer is completed thereby.

Figure 11E:
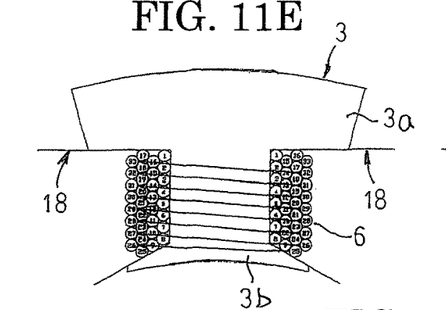

FIG. 11E shows an arranged state of conductor wire in the first layer to a fourth layer. At a twenty-sixth turn, which is the initial turn of the fourth layer, the twenty-sixth turn of the winding is entered after offsetting the conductor wire 6 by a pitch of 0.5 by moving the winding nozzle 34 in the negative (−) X direction at the connected end. The conductor wire 6 proceeds from the right slot to the left slot so as to pass over the windings on the trunk portion 11 at the connected end, and proceeds through the left slot to the unconnected end so as to pass between the conductor wire 6 in the twenty-fourth turn and the twenty-fifth turn, and then the conductor wire 6 proceeds from the left slot to the right slot so as to pass over the windings on the trunk portion 11 at the unconnected end without moving the winding nozzle 34, and proceeds through the right slot to the connected end so as to pass between the conductor wire 6 in the twenty-fourth turn and the twenty-fifth turn, to complete the twenty-sixth turn.

Next, a twenty-seventh turn of the winding is entered after offsetting the conductor wire 6 by a single pitch by moving the winding nozzle 34 in the negative (−) direction on the X axis. The conductor wire 6 proceeds from the right slot to the left slot so as to pass over the windings on the trunk portion 11 at the connected end, and proceeds through the left slot to the unconnected end so as to pass between the conductor wire 6 in the twenty-third turn and the twenty-fourth turn, and then the conductor wire 6 proceeds from the left slot to the right slot so as to pass over the windings on the trunk portion 11 at the unconnected end without moving the winding nozzle 34, and proceeds through the right slot to the connected end so as to pass between the conductor wire 6 in the twenty-third turn and the twenty-fourth turn, to complete the twenty-seventh turn. Similar operations are repeated to wind a twenty-eighth turn, a twenty-ninth turn, etc., through a thirty-third turn, to complete the fourth layer of the winding.

Figure 11F:
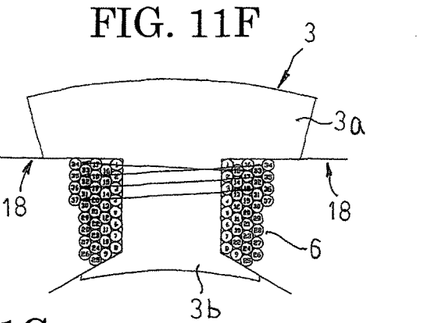

FIG. 11F shows an arranged state of conductor wire in the first layer to a fifth layer. At a thirty-fourth turn, which is the initial turn of the fifth layer, the thirty-fourth turn of the winding is entered after offsetting the conductor wire 6 by a pitch of 0.5 by moving the winding nozzle 34 in the negative (−) X direction at the connected end. The conductor wire 6 proceeds from the right slot to the left slot so as to pass over the windings on the trunk portion 11 at the connected end, and proceeds through the left slot to the unconnected end so as to pass between the conductor wire 6 in the thirty-third turn and the second flange portion 13, and then the conductor wire 6 proceeds from the left slot to the right slot so as to pass over the windings on the trunk portion 11 at the unconnected end without moving the winding nozzle 34, and proceeds through the right slot to the connected end so as to pass between the conductor wire 6 in the thirty-third turn and the second flange portion 13, to complete the thirty-fourth turn.

Next, a thirty-fifth turn of the winding is entered after offsetting the conductor wire 6 by a single pitch by moving the winding nozzle 34 in the positive (+) direction on the X axis. The conductor wire 6 proceeds from the right slot to the left slot so as to pass over the windings on the trunk portion 11 at the connected end, and proceeds through the left slot to the unconnected end so as to pass between the conductor wire 6 in the thirty-second turn and the thirty-third turn, and then the conductor wire 6 proceeds from the left slot to the right slot so as to pass over the windings on the trunk portion 11 at the unconnected end without moving the winding nozzle 34, and proceeds through the right slot to the connected end so as to pass between the conductor wire 6 in the thirty-second turn and the thirty-third turn, to complete the thirty-fifth turn. Similar operations are repeated to wind a thirty-sixth turn and a thirty-seventh turn, to complete the fifth layer of the winding.

Figure 11G:
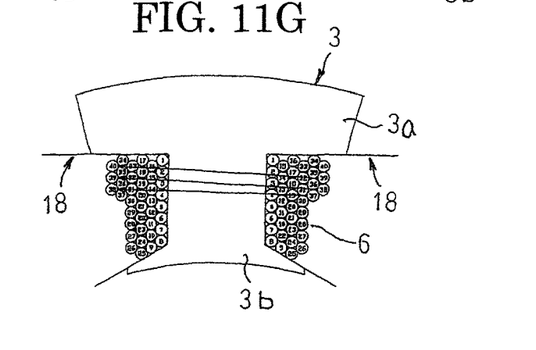

FIG. 11G shows an arranged state of conductor wire in the first layer to a sixth layer. At a thirty-eighth turn, which is the initial turn of the sixth layer, the thirty-eighth turn of the winding is entered after offsetting the conductor wire 6 by a pitch of 0.5 by moving the winding nozzle 34 in the negative (−) X direction at the connected end. The conductor wire 6 proceeds from the right slot to the left slot so as to pass over the windings on the trunk portion 11 at the connected end, and proceeds through the left slot to the unconnected end so as to pass between the conductor wire 6 in the thirty-sixth turn and the thirty-seventh turn, and then the conductor wire 6 proceeds from the left slot to the right slot so as to pass over the windings on the trunk portion 11 at the unconnected end without moving the winding nozzle 34, and proceeds through the right slot to the connected end so as to pass between the conductor wire 6 in the thirty-sixth turn and the thirty-seventh turn, to complete the thirty-eighth turn. Similar operations are repeated to wind a thirty-ninth turn and a fortieth turn, to complete the sixth layer of the winding.

Next, the coil assembly 8 that is shown in FIG. 6 is assembled by cutting the conductor wire 6, removing the core segment 3 from the clamper 31, housing the winding start end portion 6a and the winding finish end portion 6b of the conductor wire 6 in the respective conductor wire outlet grooves 17, and also folding over the first and second cover portions 20 and 21 of the insulating papers 18. Moreover, the conductor wire 6 is wound around the tooth 3b of the core segment 3 for multiple laps using the first and second insulators 10a and 10b as guides, to constitute a concentrated winding coil 7.

In this winding method, lane changes in the conductor wire 6 are made on top of the first and second insulators 10a and 10b so as to enable the conductor wire 6 to be arranged in a staggered stacking pattern inside the slots. Thus, crossover points where the conductor wire 6 in different layers crosses arise only in the coil ends, allowing the conductor wire 6 to be arranged in a staggered stacking pattern in multiple rows and in multiple layers inside the slots.

Coil assemblies 8 that are assembled in this manner are arranged in an annular shape circumferentially by butting together circumferential side surfaces of the back yoke portions 3a of the core segments 3, and are press-fitted into and fixed to an annular frame 4, or are inserted inside and fixed to the frame 4 by shrinkage fitting, to produce the stator 1. Next, the connecting board 22 is mounted onto the first axial end of the stator core 2 by press-fitting the pins that are formed on the lower surfaces of the foot portions 28 into the insulator fixing apertures 16 that are formed on the second flange portions 13 of the first insulators 10. Thus, the holder covers the concentrated winding coils 7 that are arranged circumferentially, and the peripheral wall 29 contacts the inner circumferential surfaces of the first flange portions 12 of the first insulators 10, and covers the first insulators 10.

Next, the connecting terminals 26u, 26v, and 26w are connected by TIG welding, etc., to the winding start end portions 6a of the concentrated winding coils 7, which have been led out to the respective conductor wire outlet grooves 17. The connecting terminals 26n are connected by TIG welding, etc., to the winding finish end portions 6b of the concentrated winding coils 7, which have also been led out to each of the conductor wire outlet grooves 17. The twelve concentrated winding coils 7 are wye-connected thereby to obtain a stator winding 5 that is constituted by a three-phase alternating-current winding.

Figure 12:
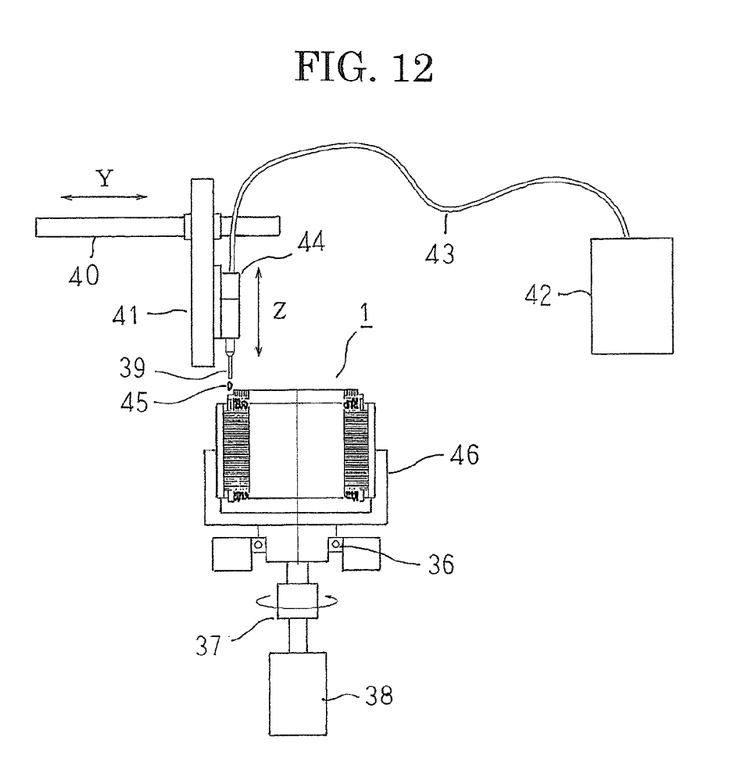
FIG. 12 is a schematic configuration diagram that shows a varnish applying apparatus in the stator for a rotary electric machine according to the preferred embodiment of the present invention.

Next, a method for applying varnish will be explained. FIG. 12 is a schematic configuration diagram that shows a varnish applying apparatus in the stator for a rotary electric machine according to the preferred embodiment of the present invention.

As shown in FIG. 12, a varnish applying apparatus includes: a holding jig 46 that is rotatably supported by a bearing 36; a motor 38 that is connected to the holding jig 46 by means of a coupling 37, and that constituted by a servomotor or a stepping motor, etc., that enables positioning; an applicator nozzle 39 for applying a varnish 45; actuators 40 and 41 that enable point-to-point control such that the applicator nozzle 39 can be moved in the Y and Z directions in the figure; a pressure tank 42 that stores the varnish 45; and a pump 44 that supplies the varnish 45 from the pressure tank 42 to the applicator nozzle 39 by means of a hose 43.

First, the stator 1 is heated using a high-temperature tank or induction heating. Then the warmed stator 1 is fixed by the holding jig 46 such that a central axis is vertical, and the first insulators 10 are on top. Next, the holding jig 46 is rotated by the motor 38 to move a first coil assembly 8 of the stator 1 to a position of application, and the applicator nozzle 39 is positioned at a varnish groove position of application by the actuators 40 and 41. Then the pump 44 is operated to apply a prescribed amount of the varnish 45 to the varnish groove 15 of the first insulator 10 of the first coil assembly 8. Next, the holding jig 46 is rotated by the motor 38 to move a second coil assembly 8 of the stator 1 to a position of application, and the applicator nozzle 39 is positioned at a varnish groove position of application by the actuators 40 and 41. Then the pump 44 is operated to apply a prescribed amount of the varnish 45 to the varnish groove 15 of the first insulator 10 of the second coil assembly 8. This operation is repeated sequentially to apply the varnish 45 to the varnish grooves 15 of the first insulators 10 of the twelve coil assemblies 8.

When the application of the varnish 45 to the varnish grooves 15 of the first insulators 10 of the twelve coil assemblies 8 is finished, the stator 1 is removed, and the temperature of the stator 1 is measured. If the temperature of the stator 1 is below a prescribed temperature, then the stator 1 is reheated. If the temperature of the stator 1 has maintained the prescribed temperature, the stator 1 is inverted by 180 degrees, and is fixed by the holding jig 46 such that a central axis is vertical, and the second insulators 10 are on top.

Next, the holding jig 46 is rotated by the motor 38 to move a first coil assembly 8 of the stator 1 to a position of application, and the applicator nozzle 39 is positioned at a varnish groove position of application by the actuators 40 and 41. Then the pump 44 is operated to apply a prescribed amount of the varnish 45 to the varnish groove 15 of the second insulator 10a of the first coil assembly 8. Next, the applicator nozzle 39 is positioned at a coil end position of application by the actuators 40 and 41. Then the pump 44 is operated to apply a prescribed amount of the varnish 45 to the coil end 7a of that coil assembly 8. This operation is repeated sequentially to apply the varnish 45 to the varnish grooves 15 of the second insulators 10a and the coil ends 7a of the twelve coil assemblies 8, completing the application of the varnish 45 to the stator 1.

Because the crossover points are concentrated in the coil ends 7a of the coil assemblies 8, gaps are formed in the conductor wire 6 inside the coil ends 7a. In the first and second insulators 10a and 10b, the varnish grooves 15 are formed so as to extend along the inner circumferential surfaces of the second flange portions 13 from a top portion to the bottom portion, and then extend along the upper surfaces of the trunk portions 11 from the first flange portions 12.

Thus, in the first insulators 10, the varnish 45 that is supplied to the varnish grooves 15 penetrates from the innermost layers of the coil ends 7a through the gaps in the conductor wire 6 toward the outermost layers. Then, the varnish 45 that has penetrated inside the coil ends 7a passes through the gaps in the conductor wire 6 and penetrates between the conductor wire 6 of the slot-housed portions 7b that is arranged in the staggered stacking pattern.

In the second insulators 10a, on the other hand, the varnish 45 that is supplied to the coil ends 7a penetrates from the outermost layers of the coil ends 7a through the gaps in the conductor wire 6 toward the innermost layers. The varnish 45 that is supplied to the varnish grooves 15 simultaneously penetrates from the innermost layers of the coil ends 7a through the gaps in the conductor wire 6 toward the outermost layers. Then, the varnish 45 that has penetrated inside the coil ends 7a passes through the gaps in the conductor wire 6 and penetrates between the conductor wire 6 of the slot-housed portions 7b that is arranged in the staggered stacking pattern.

Furthermore, in the step of applying varnish to the coil ends 7a at the second insulators 10a, even if the varnish 45 penetrates through to the coil ends 7a near the first insulators 10, increasing varnish pickup inside the coil ends 7a near the first insulators 10, the varnish 45 is blocked by the bottom surface of the holder 23 and the cylindrical peripheral wall 29 of the connecting board 22, enabling outflow from the stator 1 to be avoided. Thus, subsequent operations such as removing unwanted varnish that has adhered to other portions of the stator 1 can be omitted.

In the present invention, because the crossover points are concentrated in the coil ends 7a, varnish pickup into the coil ends 7a is increased, enabling soakage of the varnish 45 from the coil ends 7a into the slot-housed portions 7b to be increased. In addition, because the varnish grooves 15 are formed so as to face the innermost layers of the coil ends 7a, the varnish 45 penetrates from the innermost layers of the coil ends 7a toward the outermost layers, and also penetrates from the innermost layers of the coil ends 7a toward the innermost layers of the slot-housed portions 7b.

Consequently, according to the present invention, varnish pickup into the concentrated winding coils 7 can be increased. Thus, because thermal resistance among the conductor wire 6 and between the concentrated winding coils 7 and the stator core 2 is reduced, heat radiating characteristics of the stator winding 5 are improved, enabling a highly efficient motor to be achieved. Furthermore, because the conductor wire 6 is linked together firmly by the varnish 45, the conductor wire 6 will not rub together due to external vibration and electromagnetic vibrational forces, increasing durability, and improving insulation performance, thereby enabling a high-quality motor to be achieved.

Furthermore, crossover points where the conductor wire 6 in different layers crosses arise only in the coil ends 7a, and the conductor wire 6 of the slot-housed portions 7b is arranged in a staggered stacking pattern in multiple rows and in multiple layers. Thus, the conductor wire 6 can be disposed inside the slots at a high density, and space factor (the ratio that the cross-sectional area of the conductor wire occupies relative to the cross-sectional area of the slots) can be increased, enabling motor efficiency to be improved.

The invention claimed is:

1. A stator for a rotary electric machine comprising:
a plurality of core segments that each have a circular arc-shaped back yoke portion and a tooth, said plurality of core segments being arranged into an annular shape by butting together circumferential side surfaces of said back yoke portions;
a cylindrical frame into an inner circumferential side of which said plurality of core segments that are arranged into said annular shape are inserted and held;
first and second insulators that each have a trunk portion and first and second flange portions that are linked to two longitudinal ends of said trunk portion, said first and second insulators being disposed such that bottom surfaces of said trunk portions are placed alongside two axial end surfaces of said tooth such that longitudinal directions of said trunk portions are aligned with a radial direction of said tooth and said first flange portions are oriented radially inward;
a concentrated winding coil that is configured by winding a conductor wire around said tooth for multiple laps so as to pass through a concave space that is formed by said trunk portions and said first and second flange portions of said first and second insulators; and
insulating papers that are disposed between two circumferential side surfaces of said tooth and said concentrated winding coil,
wherein:
a crossover point of said conductor wire is formed on a coil end of said concentrated winding coil that is positioned above said first insulator;
slot-housed portions of said concentrated winding coil that are positioned on two circumferential sides of said tooth are configured such that said conductor wire is arranged in a staggered stacking pattern in multiple rows and in multiple layers; and
a varnish is applied to said coil end that is positioned above said first insulator.

2. The stator for a rotary electric machine according to claim 1, further comprising a connecting board that is disposed at an end near said first insulators of said plurality of core segments that are arranged into said annular shape, said connecting board comprising:
a holder that is formed by an insulating member into a ring shape that covers said concentrated winding coils;
a busbar that is mounted to said holder, and that connects said concentrated winding coils; and
a peripheral wall that is formed so as to have a cylindrical shape that protrudes axially from an inner circumferential edge of said holder, and that is positioned on an inner circumferential side of said first insulators so as to cover said first insulators.

3. The stator for a rotary electric machine according to claim 1, wherein a varnish groove is formed on an inner peripheral surface of said second flange portion and an upper surface of said trunk portion so as to extend from axially outside to a lower portion of an innermost layer of said coil end to which said varnish is applied.

4. The stator for a rotary electric machine according to claim 3, further comprising a connecting board that is disposed at an end near said first insulators of said plurality of core segments that are arranged into said annular shape, said connecting board comprising:
a holder that is formed by an insulating member into a ring shape that covers said concentrated winding coils;
a busbar that is mounted to said holder, and that connects said concentrated winding coils; and
a peripheral wall that is formed so as to have a cylindrical shape that protrudes axially from an inner circumferential edge of said holder, and that is positioned on an inner circumferential side of said first insulators so as to cover said first insulators.

5. The stator for a rotary electric machine according to claim 1, wherein:

a crossover point of said conductor wire is formed on a coil end of said concentrated winding coil that is positioned above said second insulator; and said varnish is applied to said coil end that is positioned above said second insulator.

6. The stator for a rotary electric machine according to claim 5, further comprising a connecting board that is disposed at an end near said first insulators of said plurality of core segments that are arranged into said annular shape, said connecting board comprising:
- a holder that is formed by an insulating member into a ring shape that covers said concentrated winding coils;
- a busbar that is mounted to said holder, and that connects said concentrated winding coils; and
- a peripheral wall that is formed so as to have a cylindrical shape that protrudes axially from an inner circumferential edge of said holder, and that is positioned on an inner circumferential side of said first insulators so as to cover said first insulators.

7. The stator for a rotary electric machine according to claim 5, wherein a varnish groove is formed on an inner peripheral surface of said second flange portion and an upper surface of said trunk portion so as to extend from axially outside to a lower portion of an innermost layer of said coil end to which said varnish is applied.

8. The stator for a rotary electric machine according to claim 7, further comprising a connecting board that is disposed at an end near said first insulators of said plurality of core segments that are arranged into said annular shape, said connecting board comprising:
- a holder that is formed by an insulating member into a ring shape that covers said concentrated winding coils;
- a busbar that is mounted to said holder, and that connects said concentrated winding coils; and
- a peripheral wall that is formed so as to have a cylindrical shape that protrudes axially from an inner circumferential edge of said holder, and that is positioned on an inner circumferential side of said first insulators so as to cover said first insulators.

* * * * *